Oct. 10, 1967 K. W. SCHROEDER ET AL 3,346,778
AUTOMATICALLY CONTROLLED MAGNETIZING SYSTEM
Filed Aug. 3, 1964
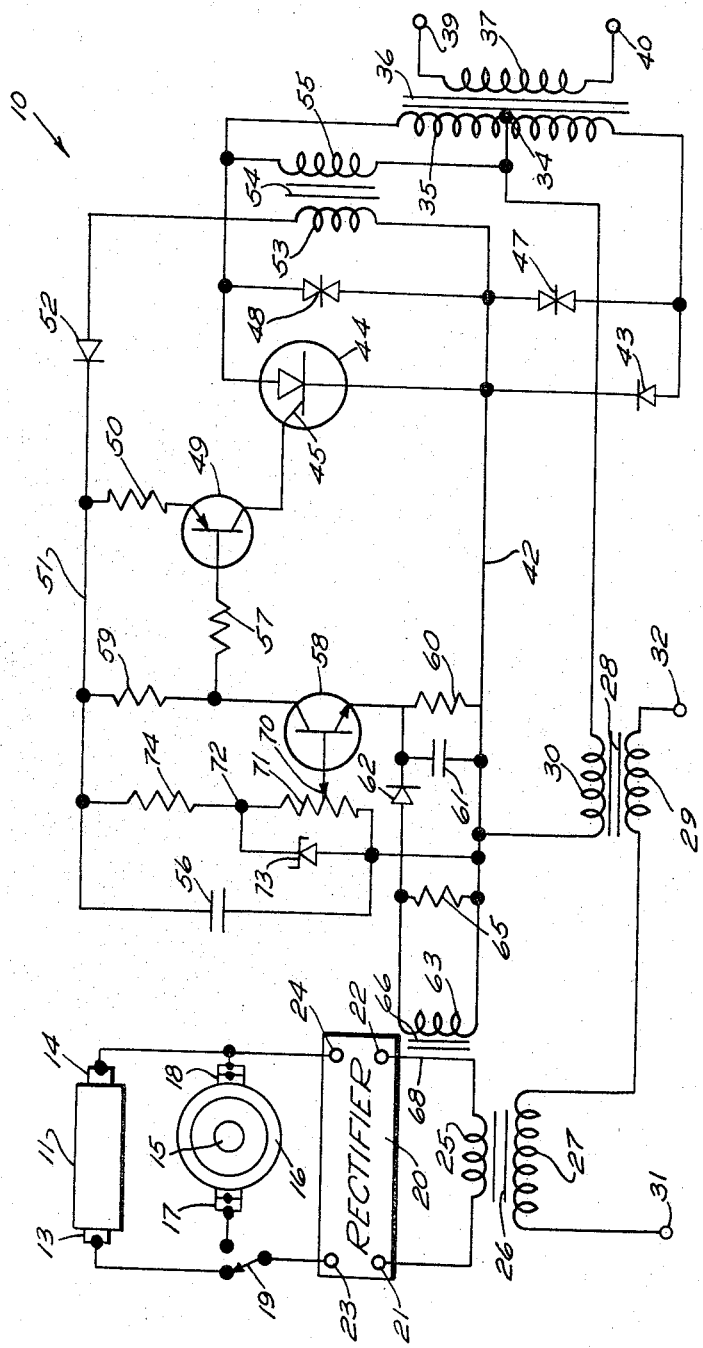
INVENTORS
KENNETH W. SCHROEDER
BRUCE G. ISAACSON
ATTORNEYS 3,346,778
AUTOMATICALLY CONTROLLED
MAGNETIZING SYSTEM
Kenneth W. Schroeder, Arlington Heights, and Bruce G. Isaacson, Chicago, Ill., assignors to Magnaflux Corporation, Chicago, Ill., a corporation of Delaware
Filed Aug. 3, 1964, Ser. No. 386,922
12 Claims. (Cl. 317—123)

This invention relates to an automatically controlled magnetizing system which was designed for and is particularly advantageous in the inspection of parts by the magnetic particle inspection method. The system is very rapid in response and permits a controlled magnetization of parts to be obtained with a high degree of accuracy, reliability and uniformity. At the same time, the system is comparatively simple in construction and operation, readily and economically constructed from standard components, easily adjusted and highly stable while being very sensitive.

Although various features of the system of the invention have other applications, it is particularly advantageous in the inspection of parts by the magnetic particle method, wherein a part is magnetized either by passing a current through the part itself or through a coil inductively coupled to the part. During magnetization, or subsequent thereto, magnetic particles are applied over the surface of the part, either in dry form or in a fluid medium, to be attracted over and concentrated by magnetic fields produced by cracks or inhomogeneities in a part, to make otherwise hidden defects readily visible.

In magnetic particle testing of parts or materials for defects, the operator or an inspector is frequently called upon to evaluate the severity of an indicated defect on the basis of the build-up of the magnetically attracted magnetic particles. For a given part, the degree of particle build-up is based in part upon the strength of the magnetic field used to magnetize the part which, in turn, is related to the amount of current passing through the part or the coil or other device used to induce the magnetic field in the part. It is found that in making contact with a part with electrodes for the purpose of passing a low voltage, high amperage current through it, careful placement, uniform part contact, uniform surface finishes and uniformly surfaced electrode faces are required if uniform magnetizing levels are to be obtained from part to part of the same geometry and metullurgy.

It is also found that when testing parts whose geometry changes considerably from part to part, as in aircraft engine overhaul testing, it is difficult to determine where to set the tap-switch, variable transformer or other device used to set the magnetizing current level, other than by trial and error and at the expense of additional time required and the risk of possible damage to the part by arcing at the electrodes, arising from starting the trial and error procedure at too high a current level.

It is further found that parts having an oxidized surface present varying degrees of contact resistance, depending upon the degree of oxidation, resulting in varying degrees of magnetizing currents applied and, in turn, varying degrees of magnetization effected.

In addition, it is found that in magnetizing circuits employing contactors or circuit breakers and rectifiers, the condition of the breaker contacts and the "age" of the rectifiers will have an effect on the magnetizing currents available through a specific part at a specific setting.

According to this invention, control means are provided responsive to load current applied to magnetizing means, to automatically maintain load current constant at a set value irrespective of variations in supply voltage and resistances in the energization and magnetizing circuits. Such automatic control insures uniform testing of a series of parts and less care is required in the placement of a part in position for magnetization and no adjustment is required, so that a much more rapid testing is possible with greatly increased production.

According to an important feature of the invention, the control means is effective to initially apply a relatively high voltage to the magnetizing means to rapidly bring load current up to the set value and to provide greater uniformity in the magnetization of the parts. This feature is also advantageous in that the initially applied relatively high voltage tends to break down extraneous layers of oxides or other insulating material at contact points, to thereafter insure the flow of current at the set value without overheating.

A specific feature of the invention is in the use of a saturable reactor having an AC winding in series between an AC supply line and a magnetizing circuit and having a DC winding to which a high control current is initially applied to make the effective impedance of the AC winding low and thereby initially apply a relatively high voltage to the magnetizing means, the control current being automatically reduced as the set value of load current is approached.

Another specific feature of the invention is in the automatic control of the energization circuit from a comparison of a signal proportional to load current and a reference signal which may preferably be obtained from an adjustable calibrated control. With this arrangement, the load current is automatically maintained at a value determined by the set value of the reference signal, the system may be readily and quickly set up for the testing of different types of parts and the need for time-consuming trial and error operations is eliminated or minimized.

A further feature of the invention is in the use of a controlled rectifier, preferably a silicon controlled rectifier, in series between the control winding of the saturable reactor and an AC supply voltage, and controlled in response to the load current signal. With this arrangement, the system can be very rapid in response, while being rugged and reliable in operation.

Another specific feature is in the control of the controlled rectifier from a comparison of a load current signal with a reference signal, wherein the rectifier is switched on when the reference signal is greater than the load current signal and switched off when the reference signal is less than the load current signal. With this arrangement, the response is very rapid but the circuit is comparatively simple in construction and operation, and economically constructed from a minimum number of parts, all of a standard commercially available type.

Still another feature of the invention is in the full wave energization of the saturable reactor control winding from an AC supply through a pair of alternately conductive rectifiers, one being the silicon controlled rectifier and the other being a standard rectifier arranged to conduct during substantially full half cycles when the controlled rectifier is non-conductive. With this arrangement, a smooth and reliable application of control current is obtained and although only one controlled rectifier is used, a range of control currents is possible which is very nearly equal to that which would be obtained with two controlled rectifiers or a single rectifier of twice the capacity. It will be understood that this feature and other specific features of the invention may be used in applications other than in the magnetic particle inspection system, although being particularly advantageous in that application.

This invention contemplates other and more specific objects, features and advantages which will become more fully apparent from the following detailed description taken in conjunction with the accompanying drawing, wherein the single figure is a schematic circuit diagram of a magnetic particle inspection system incorporating an automatic magnetizing system constructed according to the principles of this invention.

Reference numeral 10 generally designates a magnetic particle inspection system wherein a part 11 to be tested may be placed between a pair of electrodes 13 and 14 for passage of a current therethrough to develop a magnetic field in the part 11. During or after such magnetization, magnetic particles are applied over the surface of the part 11, either in dry form or in a fluid medium, to be attracted over and concentrated by localized magnetic fields produced by cracks or inhomogeneities in the part. In the alternative, a part 15 may be energized by placing it within a coil 16 having terminals engaged by a pair of electrodes which could be either the electrodes 13 and 14, or a separate pair of electrodes 17 and 18 with a selector switch 19 for selecting between use of the electrodes 13 and 14 and the electrodes 17 and 18.

To supply magnetizing current, a rectifier 20 is provided having a pair of input terminals 21 and 22 and a pair of output terminals 23 and 24, terminal 23 being connected to the selector switch 19 and terminal 24 being connected to the electrodes 14 and 18 as illustrated. The input terminals 21 and 22 are connected to a low voltage high amperage secondary winding 25 of a step-down transformer 26 having a primary winding 27.

In accordance with this invention, a saturable reactor 28 is provided having an AC coil 29 and a DC coil 30, the AC coil 29 being connected in series with the primary winding 27 of the transformer 26, between a pair of terminals 31 and 32 to which a standard alternating current supply voltage is applied.

It may here be noted that although the illustrated system is designed for single phase operation, it is readily applicable to multi-phase operation. In that case, a plurality of saturable reactors are provided having AC coils connected in series with the respective primaries of a plurality of transformers, and the DC control coils of the saturable reactors are connected either in series or in parallel, or a multi-phase saturable reactor may be used having a single control coil.

As is well known, the effective impedance of the AC coil of a saturable reactor is controllable by a relatively low magnitude DC current applied to the DC or control coil, the effective impedance of the AC coil being high when the DC control current is low and being relatively low when the DC control current is high. In the illustrated system, a relatively high DC control current is initially applied to the DC winding 30 of the saturable reactor 28 to initially make the effective impedance of the AC winding 29 low, and to thereby apply a relatively high voltage to the magnetizing circuit. Thereafter, as the current approaches a set value at which it is desired to operate, the control current applied to the DC winding 30 is automatically decreased and is maintained at a value such as to keep the load current at the set value.

To apply current to the DC winding 30, one terminal thereof is connected to a center tap 34 of a secondary winding 35 of a transformer 36 having a primary winding 37 connected to terminals 39 and 40 for application of an AC supply voltage thereto. The other terminal of the DC winding 30 is connected to a line 42 which is connected to the cathodes of a pair of rectifiers 43 and 44 having anodes connected to the ends of the secondary winding 35. The rectifier 43 is of a standard type and conducts for substantially a full half cycle when the anode thereof is at a positive potential. The rectifier 44 is a silicon controlled rectifier having a gate electrode 45 to which a control signal is applied to render it either conductive or non-conductive, and thus control the current through the DC winding 30. It is found that the amount of current passing through the rectifier 43 is quite low when the controlled rectifier 44 is cut off, due to the inductance of the winding 30, and it is possible to apply a wide range of control currents while using only one controlled rectifier.

To suppress transient voltages and protect the rectifiers 43 and 44, a pair of thyrectors 47 and 48 are connected in parallel with the rectifiers 43 and 44.

To control the rectifier 44, the gate electrode 45 is connected to the collector of a transistor 49 having an emitter connected through a resistor 50 to a line 51 which is connected through a diode 52 to one terminal of a secondary winding 53 of a step-down transformer 54 having a primary winding 55 connected between the center tap 34 and one end of the winding 35, the other terminal of the secondary winding 53 being connected to the line 42. Thus a rectified low voltage is developed between the lines 42 and 51. A filter capacitor 56 is connected between the lines 42 and 51 to stabilize the voltage and minimize variations therein.

The base of the transistor 49 is connected through a resistor 57 to the collector of a transistor 58 which is connected through a resistor 59 to the line 51. The emitter of the transistor 58 is connected to the line 42 through the parallel combination of a resistor 60 and a capacitor 61 and also through a diode 62 to one terminal of a secondary winding 63 of a current transformer 64, the other terminal of the winding 63 being connected to the line 42. A loading resistor 65 is connected in parallel with the winding 63.

The current transformer 64 has a core 66 of magnetic material placed adjacent a conductor 68 between the secondary winding 25 and the rectifier 20, in a manner such that there is induced in the secondary winding 63 of the current transformer 64 a voltage proportional to load current flowing in the magnetizing circuit. The voltage thus developed is rectified by the diode 62 and there is thus developed at the emitter of the transistor 58 a voltage proportional to load current.

A reference voltage is applied to the base of the transistor 58. In particular, the base is connected to the movable contact 70 of a potentiometer 71, preferably a precision calibrated potentiometer which is connected between the line 42 and a circuit point 72 in parallel with a Zener diode voltage regulator 73, circuit point 72 being connected through a dropping resistor 74 to the line 51.

In the operation of the circuit, the load current is initially low and the reference voltage at the movable contact 70 of the potentiometer 71 is higher than the voltage at the emitter of the transistor 58, thereby rendering the transistor 58 conductive. The potential of the collector of the transistor 58 is then low, to render the transistor 49 conductive, to apply a current to the gate electrode 45 sufficient to render the silicon controlled rectifier 44 conductive. Within a few cycles of the AC supply current, the current in the DC control winding 30 of the saturable reactor 28 is built up to a high value, to make the effective impedance of the AC winding 29 low and to apply a relatively high voltage in the magnetizing circuit. Thus the current in the magnetizing circuit is rapidly increased. When the current reaches a certain value, such that the signal at the emitter of transistor 58 is greater than the reference voltage applied to the base thereof, the transistor 58 is cut off to cut off the transistor 49 and to cut off the silicon controlled rectifier 44. The current in the control winding 30 of the saturable reactor then tends to drop to increase the effective impedance of the AC winding 29 and to decrease the energization of the magnetizing circuit. However, if the current drops substantially, such that the reference voltage at the base of transistor 58 exceeds the voltage at the emitter thereof, the transistor 58 is again rendered conductive to render the transistor 49 and thereby the silicon controlled rectifier 44 conductive. As a result, the load or magnetizing current is automatically maintained substantially equal to the set value as determined by the position of the contact 70.

This invention thus provides a system wherein a controlled magnetization of parts can be obtained with a high degree of accuracy and uniformity. The system is very sensitive and rapid in response while being highly stable and very reliable. At the same time, it is comparatively simple in construction and operation and can be readily constructed from standard components.

It will be understood that modifications and variations may be effected without departing from the spirit and scope of the novel concepts of this invention.

We claim as our invention:

1. In a system for inspection of parts by magnetization and application of magnetic particles thereto, magnetizing means for developing a magnetic field in a part to be inspected, means for energizing said magnetizing means from an AC supply voltage source, and control means responsive to load current applied to said magnetizing means for automatically controlling said energizing means to maintain load current constant at a set value irrespective of variations in supply voltage and circuit resistances, said control means comprising an adjustable current throttling device in circuit with said magnetizing means and responsive to a control current for controlling load current, and an on-off control circuit for controlling supply of control current to said current throttling device in accordance with the error between actual load current and the set value.

2. In a system for inspection of parts by magnetization and application of magnetic particles thereto, magnetizing means for developing a magnetic field in a part to be inspected, means for energizing said magnetizing means from an AC supply voltage source, and control means responsive to load current applied to said magnetizing means for automatically controlling said energizing means to maintain load current constant at a set value irrespective of variations in supply voltage and circuit resistances, said control means being effective for initially applying a relatively high voltage to said magnetizing means to rapidly bring load current up to said set value and comprising a control circuit for generating essentially a maximum error correcting signal for all values of load current below the set value.

3. In a system for inspection of parts by magnetization and application of magnetic particles thereto, magnetizing means for developing a magnetic field in a part to be inspected, means including a saturable reactor having a load current controlling circuit connected with said magnetizing means and controlling the amplitude of load current for energizing said magnetizing means, and on-off control means responsive to load current applied to said magnetizing means for controlling said saturable reactor to automatically maintain load current constant at a set value.

4. In a system for inspection of parts by magnetization and application of magnetic particles thereto, magnetizing means for developing a magnetic field in a part to be inspected, a saturable reactor having AC and DC winding means, means for connection to an AC supply through said AC winding means and arranged for applying current to said magnetizing means, sensing means for developing a load current signal proportional to current applied to said magnetizing means, and control means including amplifier means responsive to said load current signal and on-off switch means controlled between conducting and non-conducting condition by the output of said amplifier means for applying a controlled direct current to said DC winding means to automatically maintain load current constant at a set value.

5. In a system for inspection of parts by magnetization and application of magnetic particles thereto, magnetizing means for developing a magnetic field in a part to be inspected, means including a saturable reactor having a load current controlling circuit connected with said magnetizing means and controlling the amplitude of load current for energizing said magnetizing means, and control means responsive to load current applied to said magnetizing means and including silicon controlled rectifier means in a circuit controlling the impedance of said saturable reactor load current controlling circuit and operating in a conducting mode for load currents below a set value and in a non-conducting mode for load currents above the set value for controlling said saturable reactor to automatically maintain load current constant at the set value.

6. In a system for inspection of parts by magnetization and application of magnetic particles thereto, magnetizing means for developing a magnetic field in a part to be inspected, a saturable reactor having AC and DC winding means, a transformer having a primary winding connected in series with said AC winding means for connection to an AC supply and having a secondary winding for applying current to said magnetizing means, and control means responsive to load current in said secondary winding for automatically maintaining load current constant at a set value and comprising only one solid state on-off switching device controling current in said DC winding means.

7. In a system for inspection of parts by magnetization and application of magnetic particles thereto, magnetizing means for developing a magnetic field in a part to be inspected, a saturable reactor having AC and DC winding means, means for connection to an AC supply through said AC winding means and arranged for applying current to said magnetizing means, sensing means for developing a load current signal proportional to current applied to said magnetizing means, and control means including amplifier means responsive to said signal and on-off switch means controlled between conducting and non-conducting condition by the output of said amplifier means and remaining in an on condition initially until load current approaches a set value for initially applying a high current to said DC winding means to reduce the effective impedance of said AC winding means to a low value and to thereby initially apply a relatively high voltage to said magnetizing means and switching to its off condition each time the load current exceeds the set value for reducing the current through said DC winding means as said load current signal is increased to maintain load current at a substantially constant value.

8. In a system for inspection of parts by magnetization and application of magnetic particles thereto magnetizing means for developing a magnetic field in a part to be inspected, means for energizing said magnetizing means from an AC supply voltage source, and control means responsive to load current applied to said magnetizing means for automatically controlling said energizing means to maintain load current constant at a set value irrespective of variations in supply voltage and circuit resistances, said magnetizing means including electrode means for engagement with a part to pass magnetizing current therethrough, and said control means being effective for initially applying a relatively high voltage to said magnetizing means to break down extraneous layers of insulation engaged by said electrode means and comprising an on-off control element responsive to load current below the set value to remain continuously in its on condition.

9. In a system for inspection of parts by magnetization and application of magnetic particles thereto, magnetizing means for developing a magnetic field in a part to be inspected, a saturable reactor having AC and DC winding means, means for connection to an AC supply through said AC winding means and arranged for applying current to said magnetizing means, sensing means for developing a DC load current signal proportional to current applied to said magnetizing means, means for developing a reference DC signal, a controlled rectifier for connecting said DC winding means to an AC source, and means for switching said rectifier on when said reference signal is greater than said load current signal and for switching said rectifier off when said reference signal is less than said load current signal.

10. In a control system, a saturable reactor having AC and DC winding means, means for connecting said AC winding means in series between an AC supply and a load, means for connection to an AC supply and including a pair of rectifiers for supplying current in one direction to said DC winding means during alternate half cycles of the AC supply, one of said rectifiers being conductive for substantially full half cycles of one polarity, the other of said rectifiers being a controlled rectifier having a gate electrode, and means for applying a control voltage to said gate electrode to cause conduction of said controlled rectifier for a controllable fraction of the time during half cycles of the opposite polarity.

11. In a control system for supplying a controlled DC current to a load, a transformer having a primary winding for connection to an AC supply and having a secondary winding having a center tap for connection to one terminal of the load, a pair of rectifiers connecting end terminals of said secondary winding to the other terminal of the load, one of said rectifiers being conductive for substantially full half cycles of one polarity of alternating current applied to said primary winding, the other of said rectifiers being a controlled rectifier having a gate electrode, and means for applying a control voltage to said gate electrode to cause conduction of said controlled rectifier during a controllable fraction of the time during half cycles of the alternating current of the opposite polarity.

12. In a control system as defined in claim 11, said load being inductive.

References Cited

UNITED STATES PATENTS

| | | | |
|---|---|---|---|
| 3,034,021 | 5/1962 | Callihan | 317—123 |
| 3,078,396 | 2/1963 | Engelsted | 317—157.5 |
| 3,175,077 | 3/1965 | Fox et al. | 317—148 X |
| 3,267,356 | 8/1966 | Schaefer | 317—148 X |

MILTON O. HIRSHFIELD, *Primary Examiner.*

J. A. SILVERMAN, *Assistant Examiner.*